United States Patent [19]

Bewley

[11] 4,057,863
[45] Nov. 15, 1977

[54] PLIER ASSEMBLY

[76] Inventor: Homer G. Bewley, 1731 Mountain View Drive, Boise, Idaho 83704

[21] Appl. No.: 609,477

[22] Filed: Sept. 12, 1975

[51] Int. Cl.$^2$ .............................................. B25F 1/00
[52] U.S. Cl. .......................................................... 7/5.4
[58] Field of Search ................... 7/5.4, 1 H, 5.5, 5.6; 81/418, 421, 422, 423, 424, 425 R, 426

[56] References Cited

U.S. PATENT DOCUMENTS 2,948,171   8/1960   Lucibello .................................. 81/418

FOREIGN PATENT DOCUMENTS 451,282   9/1948   Canada ..................................... 81/423

Primary Examiner—Al Lawrence Smith
Assistant Examiner—Roscoe V. Parker

[57] ABSTRACT

The plier comprises a pair of jaw handles, a feed tube mounted rectilinearly through the intersection of the jaw handles. A transversely disposed knife blade mounted to the terminal end of the jaw extremity of one of the jaw handles, and an anvil jaw being mounted to the terminal end of the jaw extremity of the opposing jaw handle in approximate registry with the knife blade. The anvil jaw subassembly includes a mounting flange by which the anvil jaw is mounted to its respective jaw handle, and an L-shaped working flange which is pivotally mounted to the mounting flange transversely with respect to the plier. Further embodiments include a blade having transverse knives mounted in tandem with one of the blades being shorter in length than the other to provide combination crimper and cutter; a wire stripper which includes an L-shaped work flange having a V-shaped groove cut in the uppermost terminal edge of the work flange.

4 Claims, 5 Drawing Figures

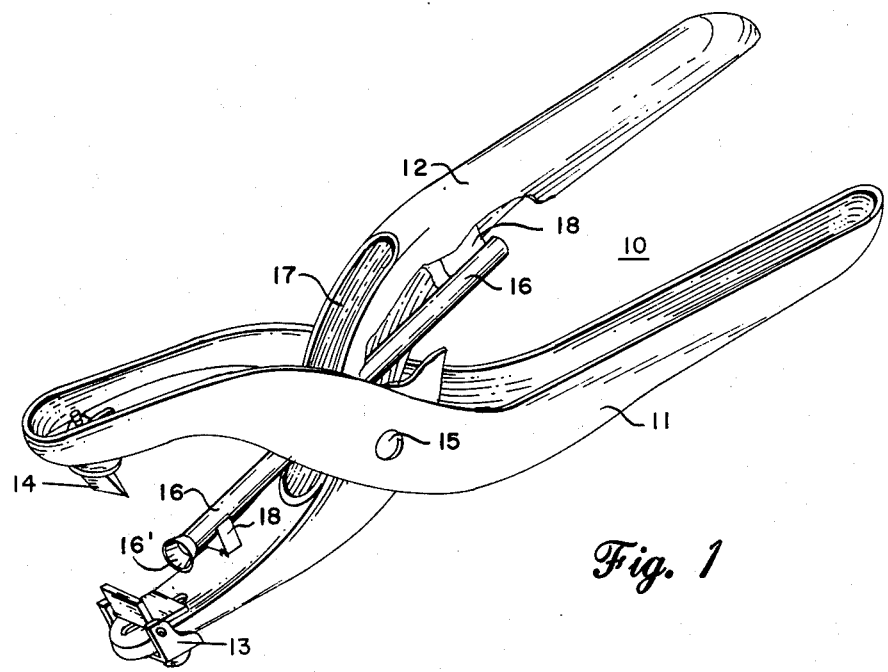
Fig. 1
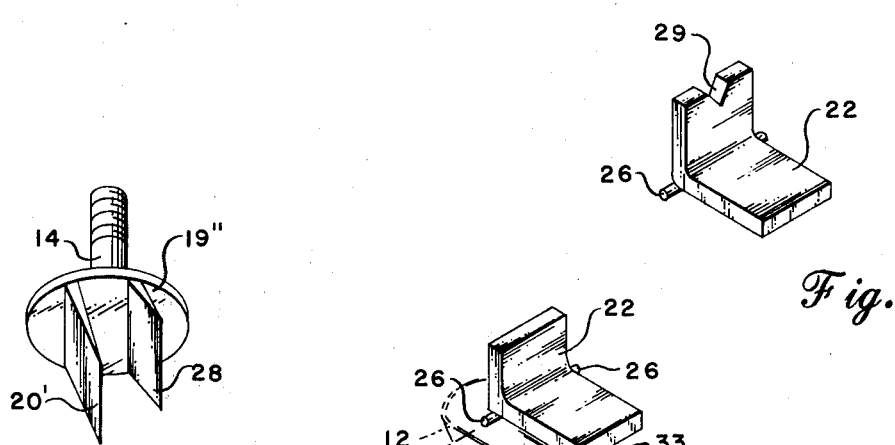
Fig. 4a
Fig. 4
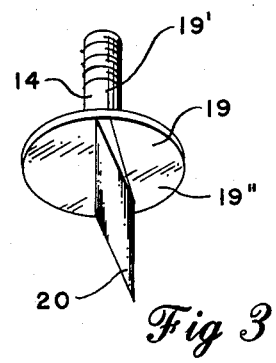
Fig. 2
Fig. 3

PLIER ASSEMBLY

FIELD OF THE INVENTION

The present invention relates to pliers and more particularly pliers having integrated means for cutting crimping and stripping rolled material such as wire and the like.

BACKGROUND OF THE INVENTION

Rolled type lead stock has long been recognized to be a convenient source of material from which weights for fishing and the like may be wrought on site. However, implements for working roll-type lead has been confined to a plurality of different pliers of the type usually employed in wire cutting and the like: A pair of cutting pliers is employed to cut a suitable length of lead material, a pair of crimping pliers are employed to detent and press the lead about the line, and still other pliers are employed to secure the lead to the line. What has been said about the use of lead in fishing may be said about other activities such as the stripping, cutting, and crimping of electrical wire and the like.

Accordingly, it is an object to the present invention to provide a plier assembly which may work rolled-type material such as wire, and the like for cutting, crimping, and pressing for various applications.

It is another object of this invention that special jaw assemblies be provided which may cut and detent wire stock in a single operation.

It is a further object of this invention that means for continuously stripping wire of insulation or covering be employed in this invention.

It is still another object to provide for convenient demoutable and interchangeable construction of both specially cutter jaws and anvil jaws herein.

These and other objects shall become apparent from the description following, it being understood that modifications may be made without affecting the teachings of the invention here set out.

SUMMARY OF THE INVENTION

The plier comprises a pair of jaw handles, a feed tube mounted rectilinearly through the intersection of the jaw handles. A transversely disposed knife blade mounted to the terminal end of the jaw extremity of one of the jaw handles, and an anvil jaw being mounted to the terminal end of the jaw extremity of the opposing jaw handle in approximate registry with the knife blade. The anvil jaw subassembly includes a mounting flange by which the anvil jaw is mounted to its respective jaw handle, and an L-shaped working flange which is pivotally mounted to the mounting flange transversely with respect to the plier. Further embodiments include a blade having transverse knives mounted in tandem with one of the blades being shorter in length than the other to provide combination, crimper and cutter; a wire stripper which includes an L-shaped work flange having a V-shaped groove cut in the uppermost terminal edge of the work flange.

A more thorough and comprehensive understanding may be had from the detailed description of the preferred embodiment when read in connection with the drawings forming a part of this specification.

BRIEF DESCRIPTION OF THE DRAWINGS

FIG. 1 is a perspective view of the plier assembly of this invention.

FIG. 2 is a perspective view of a blade attachment employable herein.

FIG. 3 is a blade attachment employable herein.

FIG. 4 is an exploded view of the anvil subassembly herein.

FIG. 4a is a perspective view of a stripping type anvil employed herein.

DETAILED DESCRIPTION OF THE PREFERRED EMBODIMENT

Referring now to the drawings and more particularly to the FIG. 1, the plier assembly of this invention is shown to advantage and generally identified by the numeral 10. The plier 10 comprises a first jaw-handle 11, a second jaw-handle 12 pivotally joined to the first jaw-handle 11, and anvil jaw subassembly 13 carried at one of the terminal ends of the second jaw 12 and a blade 14 carried at the terminal end of the first jaw 11 in registry with the anvil jaw 13.

The first jaw-handle 11 has a generally S-shaped configuration, with the extremities thereof being parallel with each other. The second jaw-handle 12 is a similarly, oppositely configured S-shaped member. The jaw-handle 11 and 12 are joined at their respective intermediate portions by a connector pin 15. One set of superimposed extremities of the respective jaw-handles 11 and 12 are extended to increase leverage and gripping area under the handle function, while the opposing extended portions are shorter to provide a working area. It is in the shorter extensions that the jaw-handles 11 and 12, that the anvil jaw 13 and blade 14 are mounted. A hollow tube 16 projects through a slotted hole 17 in the intermediate portion of the second jaw 12, and is fastened by means of webs 18 parallelly to the rectilinear axis to the jaw-handle 11. Drawing stock such as wire and the like is intended to be fed through the tube 16 into the work area of the plier 10. The terminal end of the tube 16 adjacent the work area of the plier 10 may have a flair 16' to facilitate manipulation of wire between the anvil jaw 13 and the blade 14.

The blade 14 is a sharpened cutting edge which may cut or detent wire material. As shown in the embodiment of the FIG. 2, both functions of cutting and detenting may be combined in a single structure, or a separate cutting jaw may be employed as shown in the FIG. 3. Referring to the FIG. 3 a blade 14 may comprise a mounting boss 19 having a threadable shaft 19' and a flat carrier plate 19" fastened perpendicularly with one of the terminal ends of the shaft 19'. The shaft 19' is then threadably engagable with a threaded hole at the draw extremity of the first jaw-handle 11. A wedge-shaped knife 20 issues perpendicularly from the plate 19", on the side opposite the shaft 19'. In combination with the plier 10, the blade 14 is intended to be carried transversely to the rectilinear axis of the jaw-handle 11.

Referring to the FIG. 4, the anvil jaw 13 comprises a mounting flange 21 and a working flange 22. The mounting flange 21 is a substantially U-shaped bracket member secured about the exterior side of the terminal end of the second jaw-handle 12 carrying the subassembly 13. The flange 21 is secured by means such as a nut 23, and bolt 24, secured through a hole in the jaw handle 12. The hole should be a slotted hole elongated along the rectilinear axis of the jaw-handle 12 to permit the subassembly 13 to be adjustibly secured over a limited rectilinear travel. The work flange 22 is a substantially L-shaped member having pivotally mounted by a pin 26 secured in holes 27 in the flange 21. As shown in the FIG. 1, one of the legs of the flange 22 is intended to rest on the interior surface of the jaw extremity of the jaw-handle 12, to provide a cutting face against which the edge of the knife 20 may act.

In operation, leadwire is fed through the tube 16 into the work area defined by the anvil jaw 13 and the blade 14. The leading edge of the wire causes the flange 22 to pivot such that the flange 22 is in a V-shape configuration with respect to the adjacent jaw portion of the jaw-handle 12. The plier 10 is then squeezed such that a blade 14 causes a detent in the wire. The plier 10 is again opened, and fishing line and the like is inserted into the detent. The plier 10 is closed again such that the blade 14 forces the wire into the detent, and thereafter to force the leadwire to bend and be crimped tightly about the wire. The wire is then advanced slightly through the tube 16, and the plier 10 is closed until the blade 14 cuts the wire against the face of the flange 22.

Referring to the FIG. 2, a further embodiment of the blade 14 comprises a pair parallel disposed knives 20' and 28. The first knife 20' is secured to the lower side of the plate 19" in the manner of the knife 20 described above. The knife 20' is intended to cooperate as a cutter with the outer face of the upstanding leg of the working flange 22. The second knife 28 is joined to the lowerside of the plate 19" in the manner of the first knife 20', and is disposed parallelly thereto. The length of the knife 28 from the plate 19" to its cutting edge is substantially shorter than that of the first knife 20', and does not meet the upperside of the leg of the flange 22 lying adjacent the jaw handle 12 by a substantial amount. The minimum distance between the cutting edge of the blade 28 and the interior face of the flange 22 is sufficient only to detent the wire material. The present embodiment is intended to be carried with the knives 20' and 28 disposed transversely to the first jaw handle 11, with the knife 20' disposed exteriorly to the knife 28. The second knife 28 is intended to be superimposed over the leg portion of the flange 22 lying adjacent the jaw handle 11.

Referring to the FIG. 4(a), a further embodiment of the flange 22 may be employed as means for stripping insulation from wire, and the like. The upper flange 22 is substantially the same L-shaped configuration as that of the embodiment above, and is carried by a shaft 26 as described above. The uppermost terminal edge of the upstanding leg portion of the flange 22 is provided with a centrally disposed V-shaped cutting notch 29. In operation the jaw 14 is held suitably adjacent the uppermost edge of the upstanding leg portion of the flange 22 by manipulation of the jaw handles 11 and 12. A section of wire is then drawn through the tube 16 between the blade 14 and the flange 22, and more particularly through the V-shaped notch 29 whereby the insulation is stripped therefrom.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A plier, comprising:
    a first S-shaped jaw handle and a second S-shaped jaw handle pivotally mounted to each other, the superimposed corresponding sections of said jaw handles forming suitably configured handles and jaw extremities;
    a blade including a knife disposed transversely to and being dependently carried on the interior side of the jaw extremity of said first jaw handle; and
    an anvil jaw subassembly including a mounting flange providing means for mounting the anvil jaw to the jaw extremity of the jaw handle opposing said jaw handle carrying said blade, and said anvil jaw being defined by an L-shaped working flange provided by an upstanding flange which is pivotally mounted to said mounting flange transversely with respect to said plier.

2. The apparatus of claim 1 including a hollow tube projecting through a slotted hole in the intermediate portion between the handle and jaw extremities of one of said jaws, and being fastened parallel to the rectilinear axis to the second jaw.

3. The apparatus of claim 1 wherein said blade includes a pair of blades being mounted transversely in tandem with the outer blade being longer than the interiorly disposed blade.

4. The apparatus of claim 1 wherein one of the transverse edges of one of said legs of said working flange is provided with a V-shaped notch.

* * * * *